US006734576B2

(12) United States Patent
Pacheco

(10) Patent No.: US 6,734,576 B2
(45) Date of Patent: May 11, 2004

(54) EOLIC MARINE ELECTRICAL GENERATOR GEEM

(76) Inventor: Pedro Saavedra Pacheco, Av. Huancaray Mz. B Lote 7-A, pro-Vivienda San Carlos Santa Anita, Lima (PE)

( * ) Notice: Subject to any disclaimer, the term of this patent is extended or adjusted under 35 U.S.C. 154(b) by 0 days.

(21) Appl. No.: 09/903,379

(22) Filed: Jul. 11, 2001

(65) Prior Publication Data

US 2003/0201645 A1 Oct. 30, 2003

(30) Foreign Application Priority Data

Jul. 11, 2000 (PE) .............................................. 000689

(51) Int. Cl.⁷ .............................. F03D 9/00; H02P 9/04; F03B 13/00; F03B 13/10; F03B 13/12
(52) U.S. Cl. .............................. 290/55; 290/53; 290/54
(58) Field of Search ....................................... 290/53–55

(56) References Cited

U.S. PATENT DOCUMENTS

| | | | | |
|---|---|---|---|---|
| 433,835 A | * | 8/1890 | Bair ............................... 290/55 |
| 556,396 A | * | 3/1896 | Auld ....................... 416/132 B |
| 588,143 A | * | 8/1897 | Hall ............................ 416/111 |
| 921,940 A | * | 5/1909 | Atkinson ..................... 415/141 |
| 1,046,026 A | * | 12/1912 | Salisbury ..................... 416/119 |
| 1,371,204 A | * | 3/1921 | Holt ............................ 416/118 |
| 1,649,644 A | * | 11/1927 | Alexeef ........................ 415/141 |
| 1,804,493 A | * | 5/1931 | Benjamins ............... 416/132 B |
| 3,920,354 A | * | 11/1975 | Decker ........................ 416/117 |
| 3,944,839 A | * | 3/1976 | Carter .......................... 290/55 |
| 3,978,345 A | * | 8/1976 | Bailey .......................... 290/54 |
| 3,995,170 A | * | 11/1976 | Graybill ....................... 290/55 |
| 4,001,596 A | * | 1/1977 | Kurtzbein ..................... 290/53 |
| 4,047,833 A | * | 9/1977 | Decker ......................... 290/55 |
| 4,048,947 A | * | 9/1977 | Sicard .......................... 290/55 |
| 4,049,300 A | * | 9/1977 | Schneider ..................... 290/54 |
| 4,115,027 A | * | 9/1978 | Thomas ......................... 415/2 |
| 4,119,863 A | * | 10/1978 | Kelly ........................... 290/55 |
| 4,134,710 A | * | 1/1979 | Atherton ....................... 290/53 |
| 4,191,507 A | * | 3/1980 | DeBerg ........................ 416/117 |
| 4,248,044 A | * | 2/1981 | Woodilla ...................... 60/398 |
| 4,301,377 A | * | 11/1981 | Rydz ........................... 290/43 |
| 4,313,059 A | * | 1/1982 | Howard ........................ 290/54 |
| 4,346,305 A | * | 8/1982 | White .......................... 290/55 |
| 4,366,387 A | | 12/1982 | Carter, Jr. et al. ............ 290/55 |
| 4,368,392 A | * | 1/1983 | Drees .......................... 290/54 |
| 4,679,985 A | * | 7/1987 | Worms ........................ 416/119 |
| 4,684,817 A | * | 8/1987 | Goldwater .................... 290/55 |
| 4,843,249 A | * | 6/1989 | Bussiere ....................... 290/53 |
| 4,993,348 A | * | 2/1991 | Wald ........................... 114/265 |
| 5,131,805 A | * | 7/1992 | Stevenson ...................... 415/1 |
| 5,375,968 A | * | 12/1994 | Kollitz et al. ................. 415/2.1 |
| 5,664,418 A | * | 9/1997 | Walters ........................ 60/398 |
| 5,882,143 A | * | 3/1999 | Williams, Jr. ................. 405/78 |
| 6,069,409 A | * | 5/2000 | Fowler et al. ................. 290/55 |

(List continued on next page.)

FOREIGN PATENT DOCUMENTS

| | | |
|---|---|---|
| ES | 92662 | 6/1980 |
| ES | 494227 | 8/1980 |
| WO | 89/10483 | 11/1989 |
| WO | 94/09272 | 4/1994 |
| WO | 97/47821 | 12/1997 |

*Primary Examiner*—Burton S. Mullins
*Assistant Examiner*—Pedro J. Cuevas
(74) *Attorney, Agent, or Firm*—Ladas & Parry

(57) ABSTRACT

Apparatus for generating electrical energy from a flowing medium of wind or water in which a rotary structure is supported for rotation in response to the flower medium and has an open frame with a plurality of panels pivotably mounted at end edeges therefore for movement between open and closed positions such that when the panels are in closed position they are subject to the force of the flowing medium and will produce a rotational force to generate electrical energy. After rotating 180° the panels are opened so that the frame freely rotates to its initial position. The panels are pivotably moved in synchronism by oscillating stops and a panel aligning wire.

19 Claims, 18 Drawing Sheets

U.S. PATENT DOCUMENTS

| | | | | |
|---|---|---|---|---|
| 6,072,245 | A | * | 6/2000 | Ockels ......................... 290/55 |
| 6,100,600 | A | * | 8/2000 | Pflanz ......................... 290/54 |
| 6,179,563 | B1 | * | 1/2001 | Minchey ...................... 416/17 |
| 6,294,844 | B1 | * | 9/2001 | Lagerwey .................... 290/55 |
| 6,448,668 | B1 | * | 9/2002 | Robitaille .................... 290/54 |
| 6,448,669 | B1 | * | 9/2002 | Elder ........................... 290/54 |
| 6,498,402 | B2 | * | 12/2002 | Saiz ............................ 290/55 |
| 6,508,191 | B1 | * | 1/2003 | Spoljaric .................... 114/244 |
| 6,534,881 | B1 | * | 3/2003 | Slavchev ..................... 290/54 |
| 6,551,053 | B1 | * | 4/2003 | Schuetz ....................... 415/3.1 |

* cited by examiner

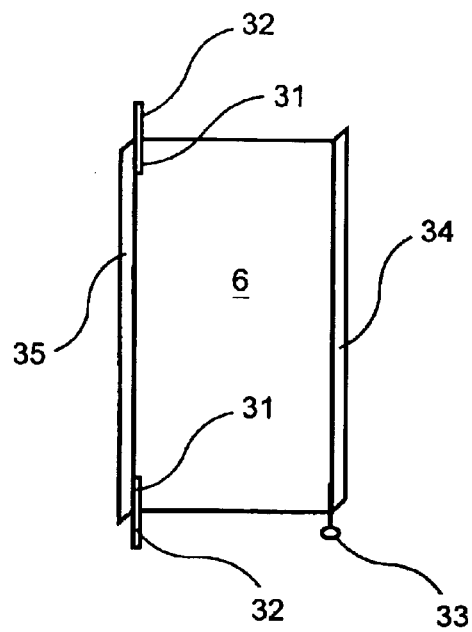
F I G. 6A
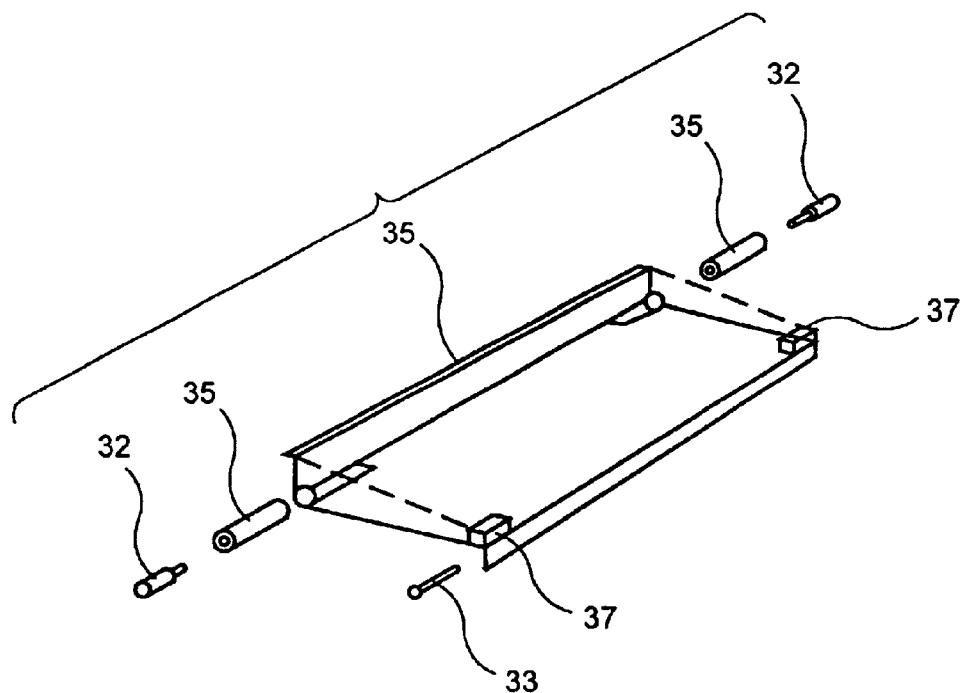
F I G. 6B

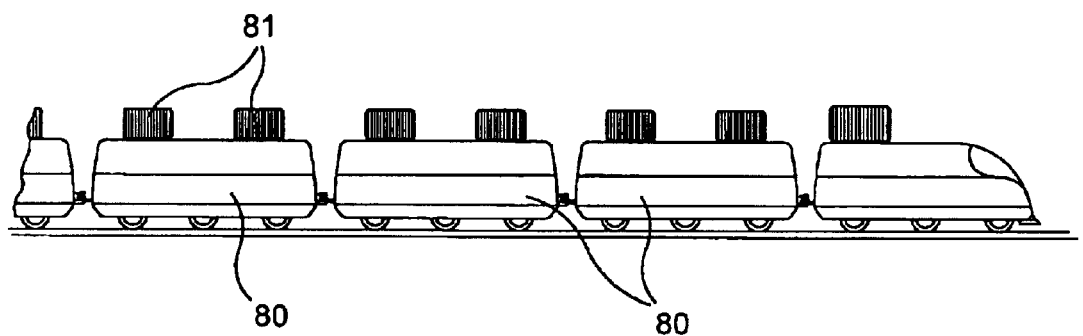
F I G. 14A
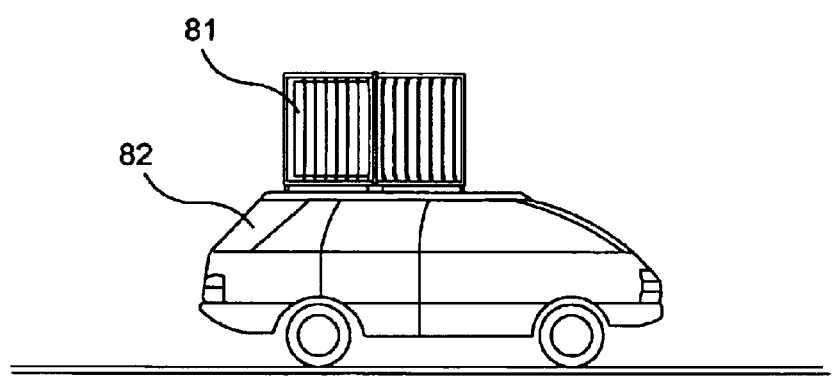
F I G. 14B

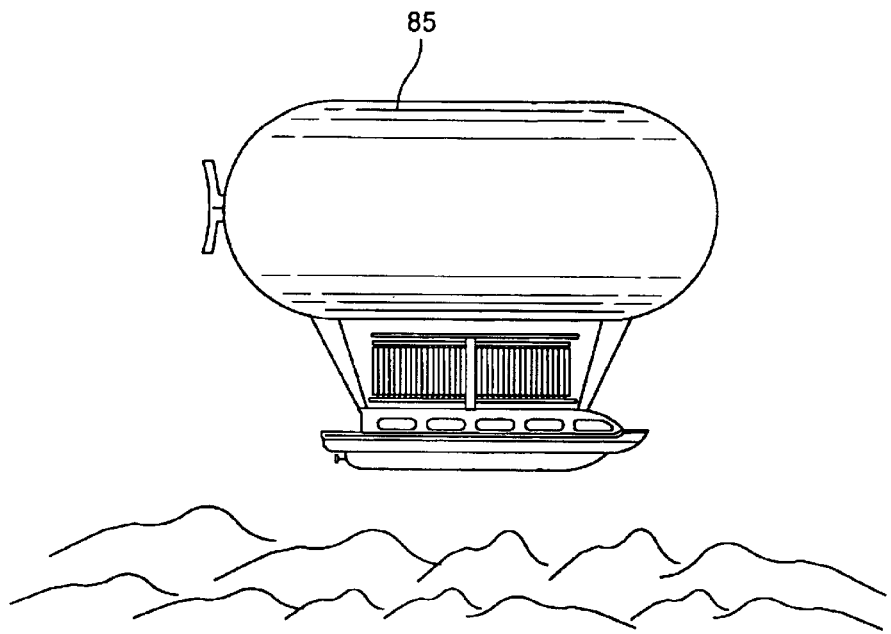
F I G. 16A
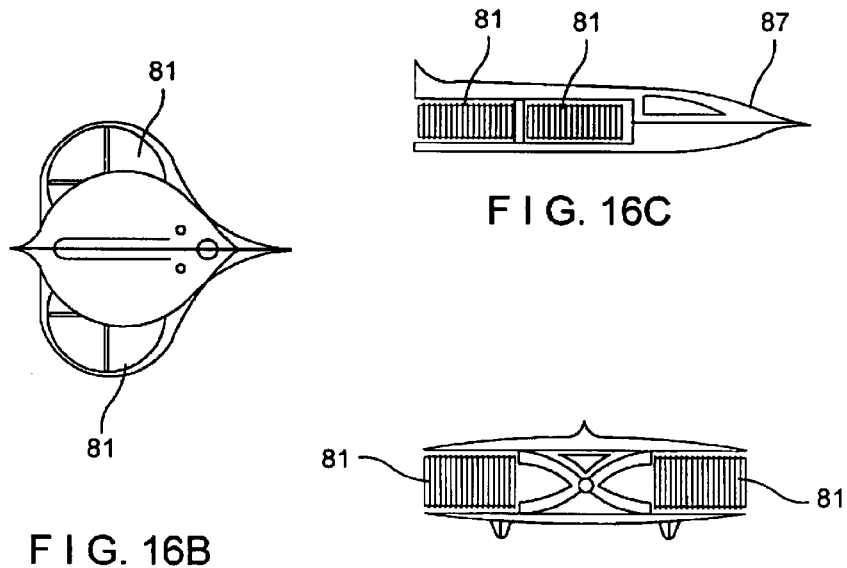
F I G. 16B
F I G. 16C
F I G. 16D

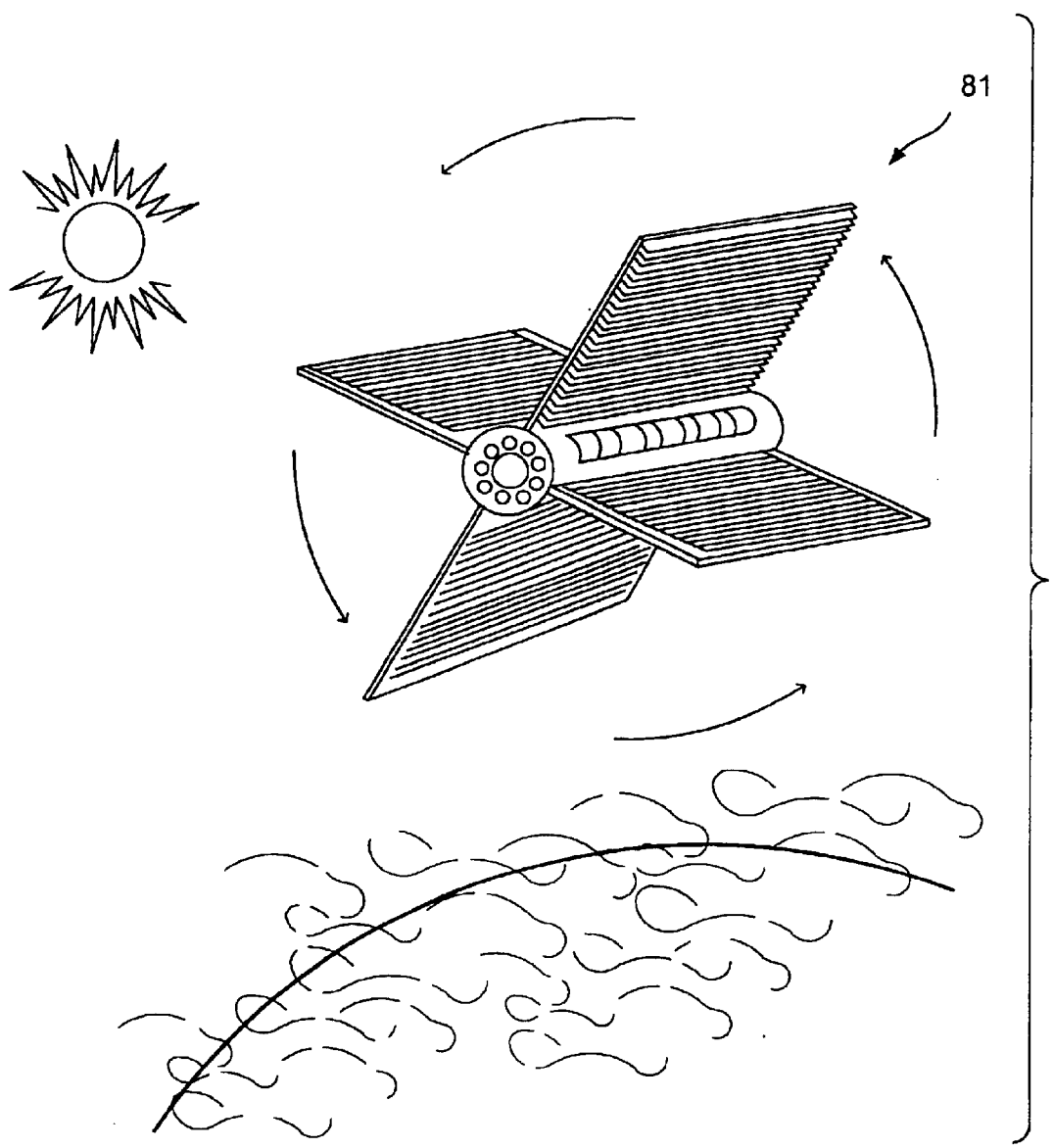
F I G. 17

EOLIC MARINE ELECTRICAL GENERATOR GEEM

FIELD OF THE INVENTION

The invention relates to electrical energy generation from wind or water.

BACKGROUND AND PRIOR ART

The present state of the art involves converting mechanical energy into electrical energy, using rotors with wind driven propeller-like blades or fans and by the use of water turbines. The National Engineering University and the Catholic University of Peru, have sponsored recent courses on wind and marine generator construction, and it is known that a series of large towers have been constructed in the USA, based on that technology, to generate electrical energy by the same system.

The latest in the world is a tower constructed in Germany, 100 m. high, with a single propeller blade 50 m in diameter, having very high generating capacity and very expensive, the construction details of which are not known.

In the hydraulic sector, references can be found a century ago, to Heron of Alexandria, who invented a steam engine, following Leonardo Da Vinci and many others seeking to take advantage of the resources of the live force of water for power. The requirements of the industrial revolution for more energy, enabled Claude Bourdin in 1824, to create the first hydraulic turbine, consisting of a machine providing a mechanism rotating at great speed, turned by the force of water beating against its blades or vanes.

Shortly afterwards, the Englishmnan, James B. Francis, created the centripetal turbine, giving a greater power yield and being the most widely used in our time, to which were added, the Pelton wheel type turbine with very concave vanes and all the developments made to these systems, which do however, require monumental costs for construction of suitable dams.

In the marine sector, the use of turbines combined with dams are known, to take advantage of the force of tides, dams able to control the flow and reflux of water and the use of reversible transmission turbines, that could convert both the ingress and discharge of water with the same efficiency. Various small domestic models have been developed in recent years, in Peru.

None of the aforementioned cases uses an oscillatory self-regulating blade, which, if it existed, from evidence of its high electricity generating capacity and low initial cost, would be the object of spectacular industrial development.

Precedents for the direct use of the force of the wind, can be found in its use on sailing ships, which were first impelled by this means over five thousand five hundred years ago, continuing until Leonardo da Vinci; who was hoping to create flying machines, using the force of the wind, a technology that was being evolved after sailing ships which eliminated the use of oars.

The sailing ship, made it possible for wind to drive heavy vessels, enabling Europeans to discover new continents and colonize large parts of the planet. This state of the art remained frozen at this time in history, because nothing more than mechanical energy was required. When electricity was invented, thoughts turned to producing it and techniques were developed to generate electrical energy by other means, but the correct response to the challenge of the wind was not found by using it to turn large panels to obtain effective rotary movement. The discovery of new physical and technical resources such as the power of steam and then the internal combustion engine, nuclear energy and other inventions, relegated eolic and marine energy, which could provide a powerful impulse to the electrical development of humanity, to second place.

SUMMARY OF THE INVENTION

The invention consists of a machine which captures natural aquatic or wind energy, being clean, renewable, inexhaustible and non contaminating, transforming it into mechanical energy, and then, electrical energy, by means of conventional transformers or dynamos.

The invention is characterized by presenting a large surface for impact by natural energy, wind and water, in a way different from existing systems of vanes or turbine.

The system consists of a fixed static structure, metallic or of reinforced concrete, containing or serving to support a rotary structure, formed by joining four or more flat panels, having a split surface divided into sections, which can be programmed to open or close between stops, welded to a rotary shaft.

The rotary shaft installed in the center of the fixed structure, will turn in one direction only regardless of the direction of the impulse force of water or wind, and will produce constant rotary movement, that will be converted into electrical energy through existing conventional generators.

The essence of the invention, is based on the variable, split sections of the panel surface, which, initially are closed, presenting a flat surface totally facing the natural energy source of its impulsive force. Second, they open allowing the energy medium to flow past at the moment the panel turns against the direction of the natural energy source, by means of oscillating, flat, rectangular vanes in the form of a "Z", which turn on a lateral shaft, installed one after the other, until covering the whole area of the panel. Vanes with oscillatory movement, controlled by stops which limit their rotation to a maximum of 90°, and are regulated or aligned by adjusting bars or cables, operating in the following way:

The vanes, overlapped and aligned, by means of an initial alignment stop, parallel to the axis of the panel frame; will present a totally closed panel with a continuous surface as if it were not split. If this position is considered as the initial or closed movement, the panel will be facing the water or wind direction, with a large contact or resistance area, thus changing the direction of the water or wind vector, because with a minimum of four panels in the system, there will always be one in the closed position, or facing the direction of the wind or water vector, absorbing its energy without any need of adapting itself to the direction of the natural element as is the case of models with existing vanes or turbines.

In the following quarter revolution, the same panel that was facing the water or wind force in the closed position, will be aligned with its direction, with the vanes aligned with the axis of the panel, permitting the free passage of the natural force without offering any resistance.

In the third quarter revolution, the vanes will turn to ninety degrees to the axis of the panel by the effect of a final turning stop and will be located in a position perpendicular to the axis of the panel frame, aligned with the direction of movement of the water or wind, presenting as a total area of resistance, only the sum of the thicknesses of their two faces, designed as elements to resist flexion of the vane.

In the last quarter revolution, by the effect of the final oscillation stop, the vanes will be maintained in the open or position perpendicular to the axis of the panel, giving as a maximum turning resistance of the panel, only the width of one vane, with the vanes ready to move to the initial zero position, closing the whole surface area of the panel and being turned successively on a rotary impulse, as with the pistons of an internal combustion engine, to generate a unidirectional rotary movement, firm and independent of the direction of the water or wind.

The oscillatory movement of the vanes will be controlled or aligned by steel or nylon cables, or of other material, which, installed at the end of the vanes will synchronize their movements, avoiding the lag in the initial oscillatory movement because of worn bearings or other factors.

DIFFERENCES BETWEEN WIND AND MARINE MODELS

FORM AND POSITION

In the wind model, the rotary shaft is installed in a vertical position. The fixed structure consists of external columns, which may be of steel or concrete. The structure serves as support for the bearings of the rotary shaft.

In the marine model, the rotary shaft is horizontal and the fixed structure supporting the vanes has two forms:

One.—The support structure is floating and has two vertical rails for sliding the fixed structure, including the rotary shaft bearings, into position.

Two.—The fixed structure is submerged and anchored to the sea bed, by steel columns or reinforced concrete plates and also contain rails to submerge the fixed structure of this model.

The fixed structure, in small or large wind models, by reasons of space in the support area, can be of radial form, with two columns at ninety degrees or less, that could cover a quarter circle or less, requiring a double horizontal structure of trusses, which, starting from the columns meet at the center, where they serve as support for the rotary shaft, being able to maintain stable equilibrium and resist wind forces or shock waves due to seismic tremors.

In large industrial multiple models, fixed structures will be built, with diametrical girders or at hundred eighty degrees, containing at the central point, the rotary shaft bearings.

A third wind model with fixed structure consists of a fixed vertical shaft over the generating room, on which the rotary shaft supported by bearings external to the fixed shaft, will turn, having trusses or turnbuckles external to the fixed shaft, that ensure the stability of the whole of the fixed shaft system.

In the generating rooms are the gearing, the rotary shaft and speed gear box and the dynamo or conventional generator, accumulators and electrical current control equipment, maintenance stores for the system and spare parts.

In the domestic or industrial models, the panel frames will be light and resistant steel or aluminum pipes, or other existing or materials designed especially for its function and necessary aerodynamic form. The vanes will be of light plates, plastic, reinforced glass fiber, stainless steel or other flat laminated material, doubled, with a structure and ends determined by practice and trials, in order give minimum flexion from the impact of the wind in cases of storms or strong winds.

The shafts or spindles of the panels will be designed, taking into account the risk of flexion, and so they will not jump out of position and be lost. They will be installed with removable bearing housings screwed or bolted to the panel frame in order to facilitate their change or maintenance. The bearings must be thoroughly protected against corrosion, with protectors or removable caps having seals or retainers incorporated into the bearing housings. The stops shall have shock absorbers made of rubber, polyurethane or other suitable material to avoid breaking the vanes by impacting each other.

The parts or components of the invention are listed hereafter

FIXED STRUCTURE: Static structure, anchored to ground or floating, of steel or concrete, of variable form and size, which serves as the support to the rotary structure, containing the rotary shaft bearings and the rails in the hydraulic or marine model.

ROTARY STRUCTURE: This is the set of elements, which, by rotary or circular motion, generates mechanical energy, consisting of a central cylindrical shaft, that rotates in bearings installed in the center of the fixed structure, receiving the impulse from the water or wind through the frames of self-regulating panels, at the same time receiving the impulse from the oscillatory vanes. The rotary structure in the wind model will have the shaft, panels and vanes in the vertical position, and horizontal in the hydraulic and marine model.

UNIDIRECTIONAL ROTARMOVEMENT: Independent of the direction of the water or wind vector, programmable in its sense or direction at will, by the arrangement of the vanes in relation to the shaft of the panel frames, the position of which determines a circular movement towards the right or left of the rotary shaft and which is programmed in the following way:

For the vanes turning clockwise, the initial moment of rotation will be with the left panel, aligned or closed, with the vanes turning on their shafts to the right side and overlapping the following one with its left side, at the same time that the panel on the right side has the vanes aligned with the water or wind direction, and opened or perpendiculars to the shaft of the panel on the right side.

For the panels turning counter-clockwise, the right side panel will be, receiving the impulse from the water or wind towards the left, turning the varies with the shafts towards the left side and overlapping the following one with its right side or edge, at the same time that the left side panel has the vanes opened or aligned with the water or wind direction, a position which determines that the rotary shaft makes a unidirectional movement independent of the direction of the water or wind, which for patenting purposes is called a procedure.

ROTARY SHAFT: Consists of a cylindrical steel pipe or other material, divided into four or more equal parts, with bearings at each end, installed at the center of the system, to which the panel frames will be bolted or welded, also containing the brake for stopping the system for maintenance or installation and coupled by pinions or a pulley system to the transmission system to the speed change gearbox.

PANEL FRAMEWORK: Consists of two rectangular or aerodynamic pipes for each panel, that will be welded or bolted to the rotary shaft, at 90° and in radial form to the other panel frame, the distance between them being determined by the length or size of the vanes, parallel between pairs or panels, containing vane spindles, spindle bearings and the self-regulating stops, the parallel distance being maintained by perpendicular pipes and diagonal ties or turn buckles on the side opposite to the area of oscillation of the vanes.

SELF—REGULATING PANELS: Flat surface element, of rectangular or square form contained in the panel framework, with a turning motion, divided into rectangular parts oscillating lengthwise, with a surface which when closed, converts it into a closed panel absorbing the force of water or wind and when it is open to return or pass against that same natural force, generating a continuous rotary movement, and converting the force of water or wind into mechanical energy and this, into electrical energy.

OSCILLATORY VANES: Component dividing the panel into rectangular elements, laminated and flat, with double skinned sides and ends with a structural function, manufactured in two forms: First, with projecting cylindrical shafts from one side to the two ends. Second, with moldings or semi- cylindrical relief at both ends for the bearing mounting shaft, or oscillating spindle. The vanes will be manufactured with light laminated steel, plastic or reinforced fiber glass plates, with protective finishes against environmental corrosion. Includes molded adjustment covers installed with bolts or rivets, for pipes or spindles for mounting bearings.

OSCILLATORY VANE MOVEMENTS: Procedure characterized by the automatic self-regulation of the vanes in relation to the direction of movement of the water or wind and the panel framework. The vane, the movement of which during a 360° rotation of the panel, is the essence of the present invention, and will have the following steps:

Taking as a first step or initial position of the panel for a turn of 360°, a position completely against the direction of the water or wind, the vanes will be aligned one behind the other to the shaft of the panel framework, whether to the left or right of the rotary shaft, overlapping or closing the whole panel. In this position, said panel will receive the maximum impulse from the water or wind, an impulse that will be transmitted to the rotary shaft through the panel framework.

At the start of the following quarter turn, the vanes continue to be aligned with the shaft of the panel framework, with the water and wind direction, offering as total resistance, the thickness of the double structure of a single vane or the minimum of the whole turn.

In the following 90° of rotation, with the frameworks at 180°, the vanes that they were aligned with the water or wind direction and the panel framework, will open, turning 90° on its eccentric shaft, allowing the water or wind to pass freely, each vane offering in resistance, only its structural thickness and together the sum of the vane thicknesses.

Toward 270°, the vanes prevented from turning through more than 90° on the shaft, will present the most turning resistance, but will continue follow open or parallel to each other, allowing the water or wind to pass without difficulty. In the fourth fraction toward 360°, the vanes in a perpendicular position to the shaft of the panel, will give a total resistance equal to the width of a single vane, being ready to be turned on the shaft of the panel to be closed again, continuously generating a rotary movement that it is the object of the invention.

VANE SHAFTS OR SPINDLES: Consist of steel bars or other material, turned cylindrically to fit the interior of bearings or bushes, installed on one side of the palettes projecting from both ends, for the purpose of oscillating the vanes or installed in the panel frameworks, to be adjusted to the bearings or bushes installed to one side and at the ends of each vane, fitted with molded flanged plates fitted with bolts, self-tapping screws or rivets, removable for maintenance.

VANE OSCILLATION STOPS: Consist of stops welded or bolted to the panel framework, projecting from this to the vanes to limit the oscillatory movement of the vanes from 0° when they are aligned with the panel framework, to 90° or perpendicular to this, at the end of the oscillatory movement.

REGULATOR OR VANE ALIGNER: Consists of a steel, aluminum, fiber or other material cable, installed by the external section or edge opposite the shaft from the bottom end of the vanes, on some fixed revolving supports to the lower part of the vanes, with a union rod to the regulator cable in the form of a shaft or a washer; one of the vanes of each panel, keeping them in the same oscillating position, closed or open, at 0° to the vanes aligned with panel framework and at 90° from this as the maximum limit of oscillation, avoiding defects, disagreements or mis-timing between the vanes.

TRANSMISSION OF ROTARY MOVEMENT: Consists of a set of pinions, that transmits the circular movement of the rotary shaft directly to the eolic generators or through a cylindrical shaft that is coupled at 90° with the submerged rotary shaft rising to the surface to the speed change gearbox, in the case of river or marine models.

BRAKE FOR THE WIND ROTARY SHAFT AND THE MARINE TRANSMISSION SYSTEM: Consists of a mechanical or hydraulic brake applied to the rotary shaft and the pulleys or pinions in the wind model, and to the transmission surface shafts in the river or marine models, in order to immobilize the system for maintenance.

SUPPORTING PIPE FOR VANE BEARINGS: Consists of a cylindrical pipe machined internally to fit the bearing for the oscillatory vane spindle, in the event of it being fitted in the vane and which will be installed in the molded lower and upper sections of each vane and fitted with bolted or riveted covers.

SUPPORT PLATE FOR VANE BEARING: Consists of a rectangular plate machined to fit a vane shaft bearing in its center, in the event of the bearing being installed in the panel framework, with countersunk holes for installation, and rectangular plate with a groove to the center, equal to the diameter of the vane spindle, fitted with bolted to the panel framework, in the event of the vane being installed to one side of the panel framework FIXED RADIAL WIND STRUCTURE: Consists of two or more columns installed in the external circular area of the system, that support radials trusses that are joined at the central point of the "GEEM" supporting at its center the lower and upper rotary shaft bearings, and located over the generation room and occupy spaces of less than 180° of the circle of rotation of the system as points of support.

DIAMETRICAL WIND FIXED STRUCTURE: Consists of three or more columns installed outside the circular area of the wind driven generator and which supports a 180° truss and another perpendicular at 90° that supports at its central point the rotary shaft bearings, defining the electrical generation room, and requires a minimum supporting space of 180° of the circular perimeter of the wind driven generator.

FIXED WIND DRIVEN STRUCTURE WITH STATIC SHAFT: Consists of a fixed structure with a vertical static column or cylindrical shaft, installed at the center of the "GEEM" over the electrical generation room, around which will be installed the tubular rotary shaft, or divided into four or more sections corresponding to each panel, fitted with flanges. On the fixed shaft the upper and lower rotary shaft bearings will be installed, and which at the same time will be fitted with corresponding sectional tracks for each panel. The fixed or static shaft, when necessary, will be immobilized from its highest part, with tensile steel cables, from columns installed in the perimeter of the "GEEM", lessening the cost of the structure and obtaining greater length panels that in the others models or forms.

FIXED MARINE STRUCTURE: Consists of a removable structure in the form of an inverted U, with a horizontal section on the platform or surface and two vertical rails at its ends, which submerged, will serve to support the rotary shaft bearings; the panels and the vanes. The fixed marine or river structure will be slid for installation or removal, by some additional rails fixed to the concrete blocks or steel on land or to submerged columns in floating units.

MARINE ROTARY STRUCTURE: Consists of a metal bar or cylinder installed on the removable fixed structure, revolving on submerged bearings and containing the panel framework, the oscillatory vanes, impounds and converts the water energy into rotary movement that is transferred to the transmission shaft through pinions. The system must be manufactured with stainless material of high resistance to the force of waves and marine currents.

SUPER FIXED MARINE STRUCTURE: Consists of an additional structure to the removable fixed structure, that serves as support to the removable fixed structure and it must of be built with great inflexibility and stability, with anchor plates fixed to the bank of rivers, or the sea bed, in the beach coastline, or where they may be marine currents or as inverted columns in floating structures, with material that may be concrete blocks or column or steel plates, that contain the rails by which the columns of the removable fixed structure are slid into position.

DIVIDED ROTARY SHAFT: Consists of four or more equal metal sections with seats for the rotary shaft bearings at the upper and lower ends, corresponding to each panel, and joined by flanges integral with them to form a rotary shaft to be installed on the fixed static shaft, a divided shaft that will support the panel frameworks and at the same time will serve also as support for the lower pulley or pinion that will transfer the rotary movement to the speed change gearbox, and will serve as support to the brake for the rotary structure, for installation and maintenance.

MULTIPLE WIND DRIVEN GENERATOR: Consists of a set of panels superimposed vertically over each other, in order to increase the impounding or impulse area, thus having more panels on the same rotary shaft, with an increase of rotary shaft bearings and increased length of the arm of the panel levers, with reinforced panel frameworks in the form of trusses until the limit of material stress, obtaining huge panels with maximum impounding capacity area of eolic power, for which radial balance tumbuckles will be used between panels and diagonal ties against vertical flexion, also subdividing the frameworks into sections or structural nodes with correspondents tensile cables for the opposite side of the oscillation area of the vanes.

ADDITIONAL ELECTRICAL BOOSTER: Consists of a vertical rotating cylinder, activated by an electric motor installed at a fixed point external to the circle, generate by the Eolic GEEM, the external rotating surface area of the cylinder being exactly equal to the circle generated by the end of the lower section of the panel framework and by being turned and rubbing tangentially against a curved plate at the end of the panel; will give it an impulse, additional to the force of the wind, by being turned in the opposite direction to the rotary movement of the "GEEM", to increase the efficiency of the system . The speed of the rotary cylinder booster will be inversely proportional to the speed of the wind and it will be regulated by an electronic logical controller. The cylinder will be installed in a static fixed point of the wind driven generator working at ground level in high altitude zones such as mountain summits and on trusses projecting beyond the elevation tower in the event of generators built at ground level.

IMPULSE PLATE: Consists of a vertical plate the curve of which is exactly equal to the circle generated by the panel frames of an Eolic GEEM, and being a part of this, is installed in vertical plane with the convex section towards the outside, to receive an additional impulse tangentially, from the rotary cylinder, to the force of the wind, accelerating it and increasing efficiency.

The plate, because of expansion effects of the panel framework will be mounted on springs fixed to the plate on a mobile shaft, which will absorb the expansion, being separated from the end of the panel framework, by a distance equal to the calculated expansion of the panel framework and will have a slight curve of the vertical ends towards the concave section of the plate, of a dimension equal to the calculated expansion of the panel framework, thus avoiding a violent shock with the rotary cylinder.

WIND AND MARINE COMPOUND GENERATOR: Consists of two or more wind or marine generators installed side by side to add their rotary movement together to a single conventional electrical generator in the following way:

The wind compound generator, by the installation of two or more generators, with their rotary shafts connected at ninety degrees by means of pinions to a horizontal rotary shaft, transmitting this rotary movement to a differential gear which duplicates or triplicates the total power fed to the electric generator; thus enabling the use of high capacity electric generators.

In the marine compound generator, by the construction of two or more generators, with vertical transmission shafts, delivers the partial power to a common horizontal rotary shaft by means of pulleys or pinions for it to be coupled directly to the conventional generator, thus sufficient power to drive a high capacity electrical generator.

DESCRIPTION OF THE FIGURES OF THE DRAWING

FIG. 6A shows a vane of the rotary element of the wind driven generator.

FIG. 6B is an exploded view of the vane.

FIG. 14A illustrates, the wind driven generator attached to railway cars.

FIG. 14B illustrates the wind driven generator attached to an automobile.

FIG. 16A illustrates the wind driven generator attached to a dirigible.

FIGS. 16B–16D show the wind driven generator attached to an airplane.

FIG. 17 is a perspective view of the generator on an orbiting space vehicle.

DETAILED DESCRIPTION OF THE DRAWING

Figure 1:
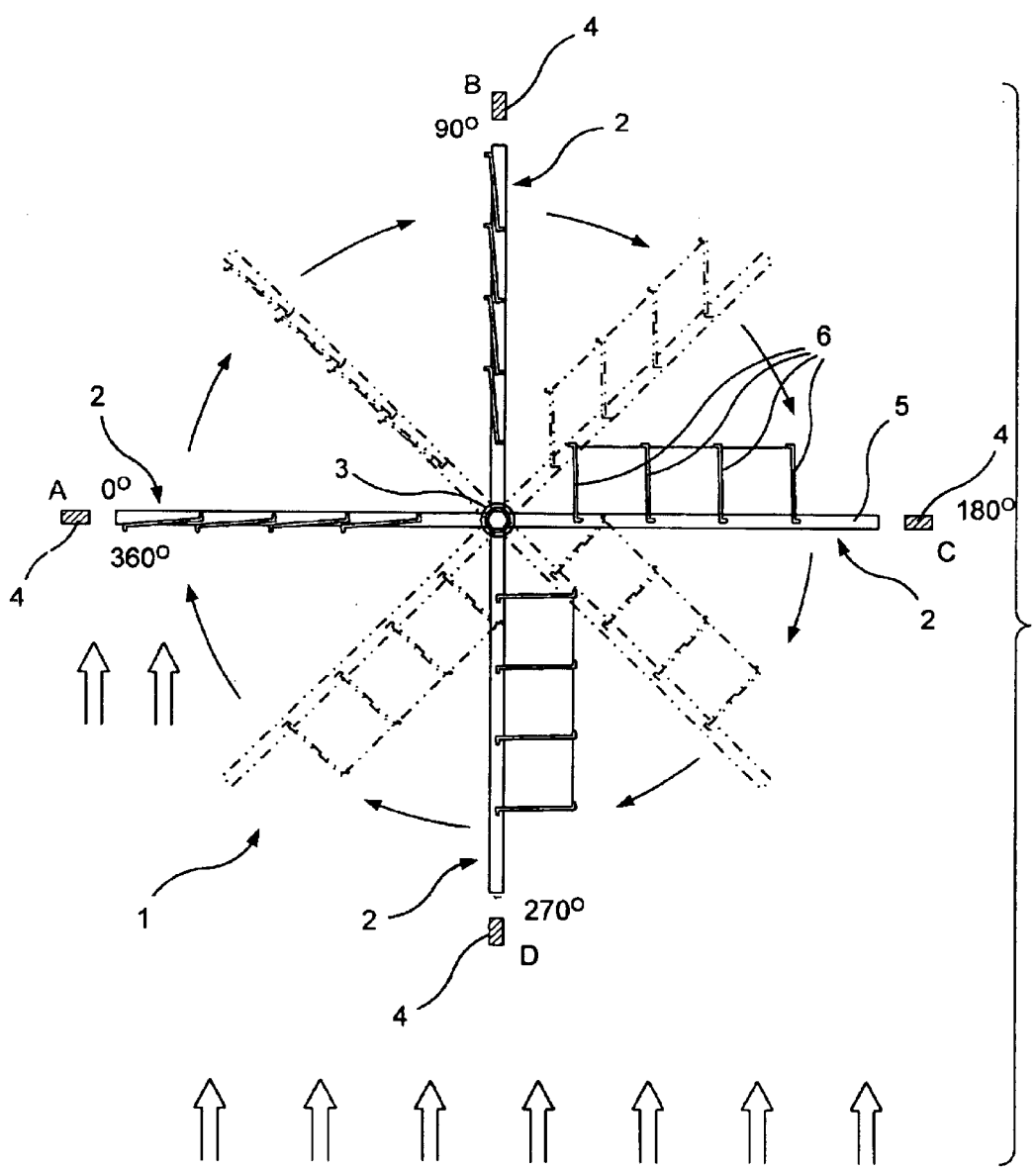
FIG. 1 is a plan view of a rotary element of a wind driven generator according to the invention.

The wind driven generator plant in FIG. 1 comprises a rotary assembly 1 of four panels 2 equal angles of 90°. The rotary assembly rotates around a central rotary shaft 3 by impact of the wind against the panels. The rotary assembly is supported by a fixed structure diagrammatically illustrated by columns or trusses 4. Each panel 2 comprises an open frame 5 on which a number of vanes 6 (four vanes are shown in FIG. 1) are rotatably supported. The vanes 6 assume different angular positions in their respective panels as the assembly 1 rotates as shown at the four angular positions A, B, C, D. At position A the vanes are closed and lie in the plane of the frame 5 to face the direction of the wind, shown by the arrows to receive impulsive force from the wind to turn the assembly 1 clockwise. After turning 90° to position B, the vanes 6 remain closed and offer no resistance to the wind. After the next quarter turn to the 180° position C, the vanes 6 are opened and aligned with the wind direction to permit the wind to flow freely through the open panel with substantially no resistance.

After turning 270° to position D the vanes 6 are perpendicular to the frame 5 offering a resistance equal only to the width of one vane. Towards 360° or the initial point, the vanes will offer a little more resistance but are ready to be moved into the plane of the panel frame 5, to repeat the circular movement generated indefinitely.

Figure 2:
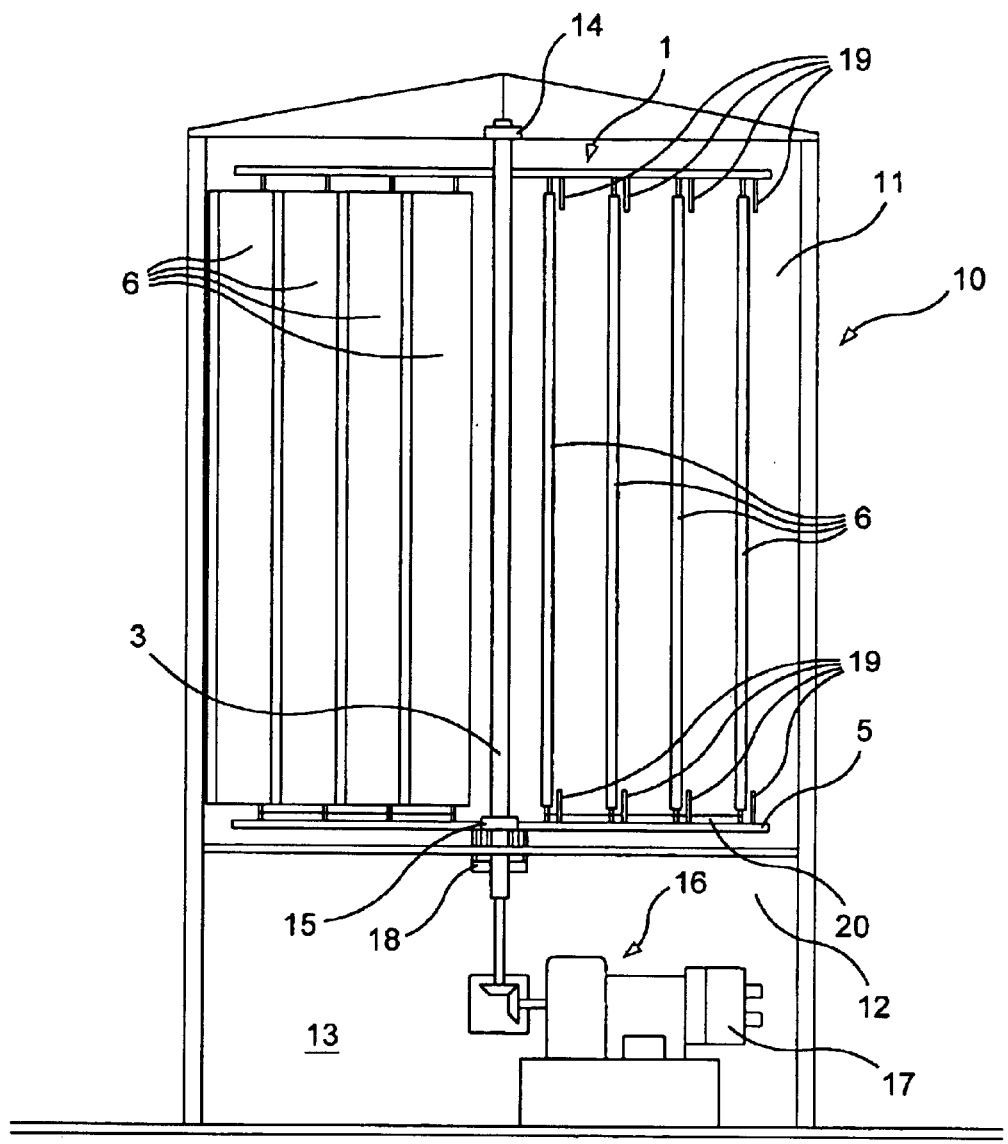
FIG. 2 is an elevation view of the wind driven generator.

FIG. 2 shows a fixed structure 10 defining an upper space 11 containing rotary assembly 1 and a lower space 12 contains an electric generator room 13. The central rotary shaft 3 is rotatably supported by upper bearing 14 and lower bearing 15. The lower end of the rotary shaft 3 is connected by a transmission 16 to an electrical generator 17. A brake 18 is disposed at the lower end of the rotary shaft.

In the upper space 11, the frames 5, are welded or joined to the rotary shaft 3.

In the upper space 11 at the left, is seen a panel 4 with four closed vanes 6 and to the right of the rotary shaft are four opened vanes 6. At the upper and lower edges of a panel 4 are oscillation stops 19 and at the lower edge of the panel is an aligning cable 20. The oscillation stops 19 serve to block rotation of the vanes past the 0° position when the vanes 6 are in the plane of the frame 5. The oscillation stops 19 are welded or bolted to the frame 5 and project into the rotation path of each vane to limit oscillation thereof from 0° when aligned in the plane of the frame 5 to a maximum of 90° in its perpendicular open position at the end of its oscillating movement. The aligning cable 20 is connected to the vanes 4 as will be explained in detail later to maintain the vanes 6 in a uniform oscillating position closing or opening them simultaneously and limiting oscillation of the vanes to the 90° open position.

Figure 3:
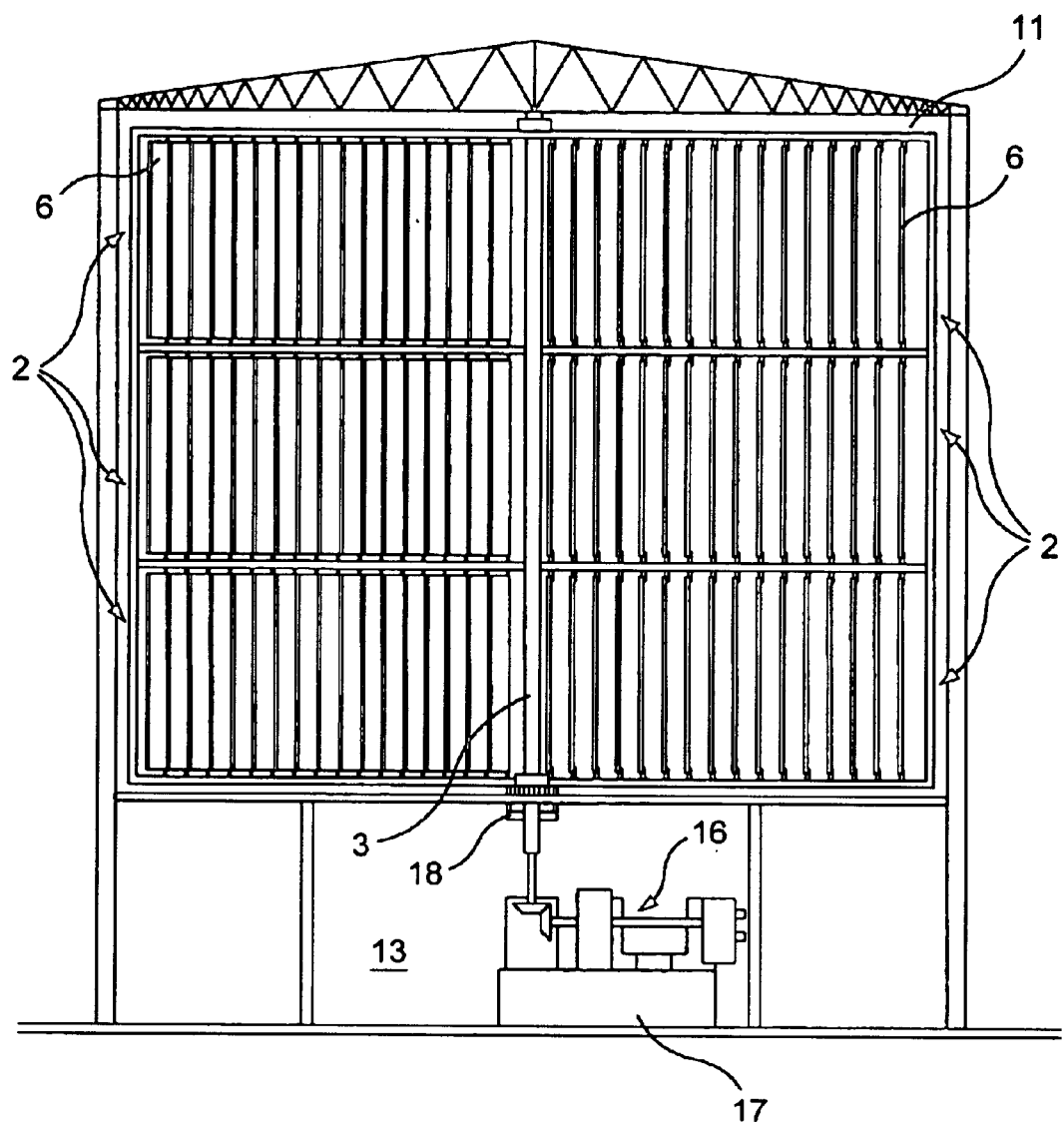
FIG. 3 is an elevation view of another embodiment of the wind driven generator.

In the upper space 11 of the fixed structure in FIG. 3, there are six panels 2, each having fifteen vanes 6, one above the other, in three tiers, having a common rotary shaft 3 and a single fixed structure. Panels 2 are in the closed position on the left side and the vanes 6 are open on the right side allowing the wind to pass freely therethrough.

In the lower space 12 is the generator room 13 as in FIG. 2.

Figure 4:
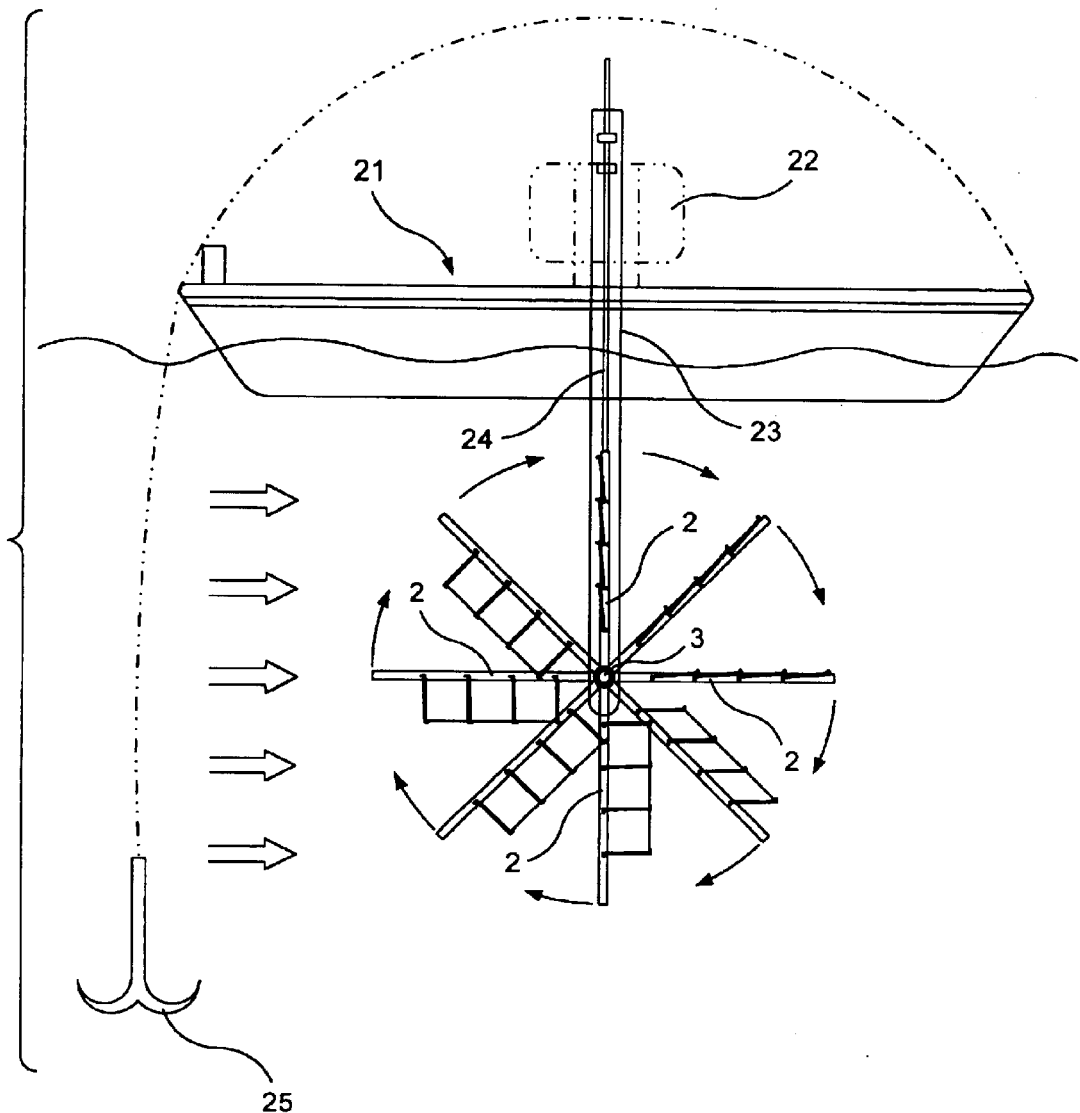
FIG. 4 is a diagrammatic illustration of a floating marine generator according to the invention.

FIG. 4 shows a floating marine generator having a float platform 21, on which there is a conventional generator 22 with a speed change gearbox that receives the rotary movement. A column 23 goes down into the water and contains a transmission shaft 24 connected to panels 2 of rotary assembly 1.

The direction of the water flow is shown by arrows and produces clockwise revolving movement of the rotary assembly by impact with the panel with closed vanes causing rotation of central shaft 3 to drive column 23. To the left is the anchor 24 of the floating marine generator.

Figure 5:
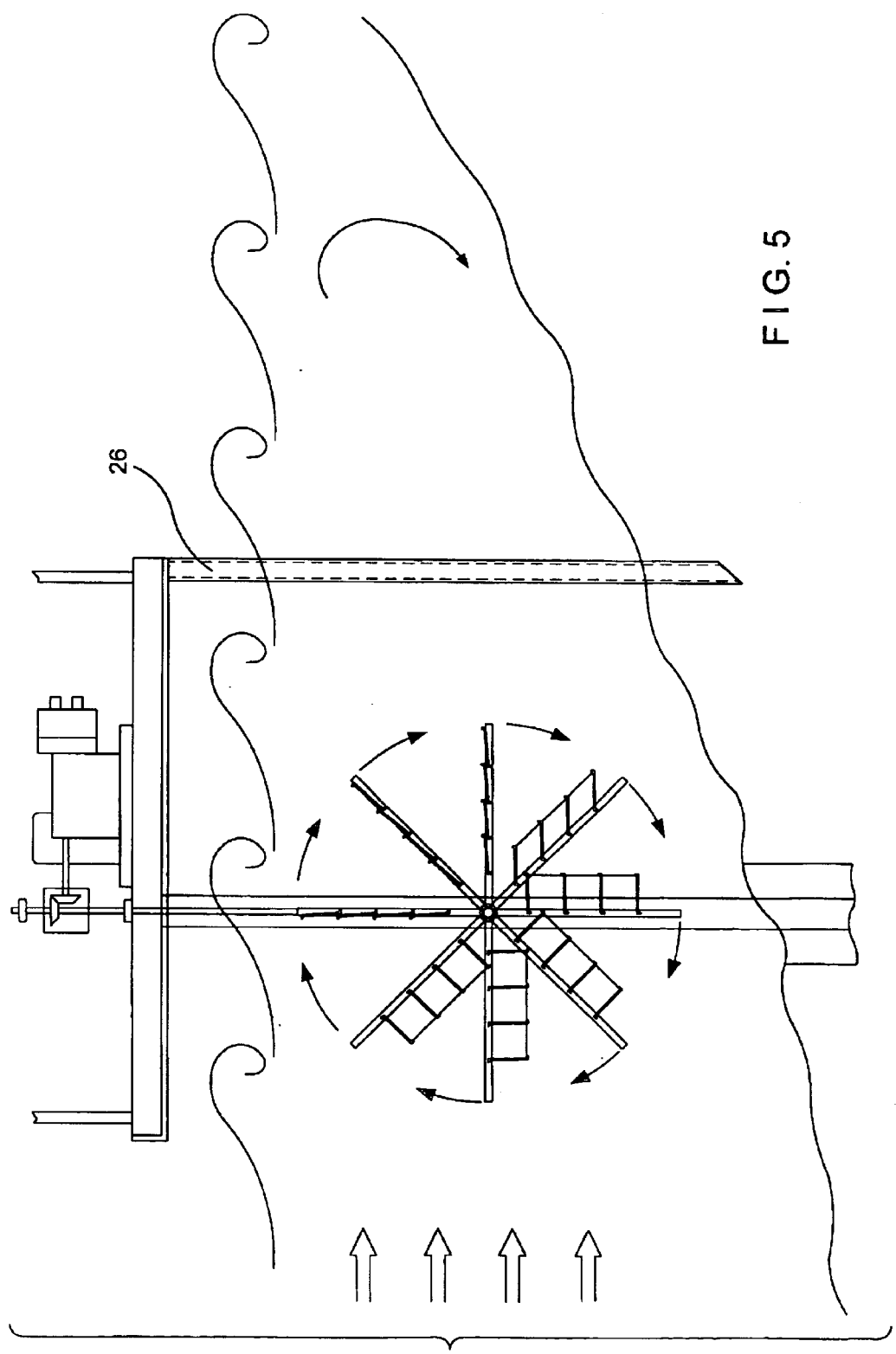
FIG. 5 is a diagrammatic illustration of a fixed marine generator according to the invention.

FIG. 5 shows a fixed marine generator which is similar to FIG. 4 except that column 23 is anchored in the sea bed. A reinforced column 26 is also provided.

FIGS. 6A and 6B show the details of construction of one vane 4. In these Figures the following elements are seen.

1. Sleeves 31 are secured at the upper and lower edges of the rectangular vane.

2. The vane is rectangular with the length greater than the width to receive the force of the water or wind from the effect of the impulse 3. Spindles 32 are mounted in the sleeves 31 and project at each end of the vane.

4. A support 33 for an aligner cable is secured in the interior angle of a bent end of the vane which resists deflection.

5. The side edge 35 of the vanes are bent where it receives the sleeves 31 to prevent deflection of the vane due to the force of wind or water, where greater resistance is required. The sleeves 31 receive bearings 35 which in turn rotatably supports spindles 32. The vane can also be folded at its upper and lower edges as shown at folds 36 for additional resistance. The contact surface of the vane is provided with shock absorbers 37.

Figure 7:
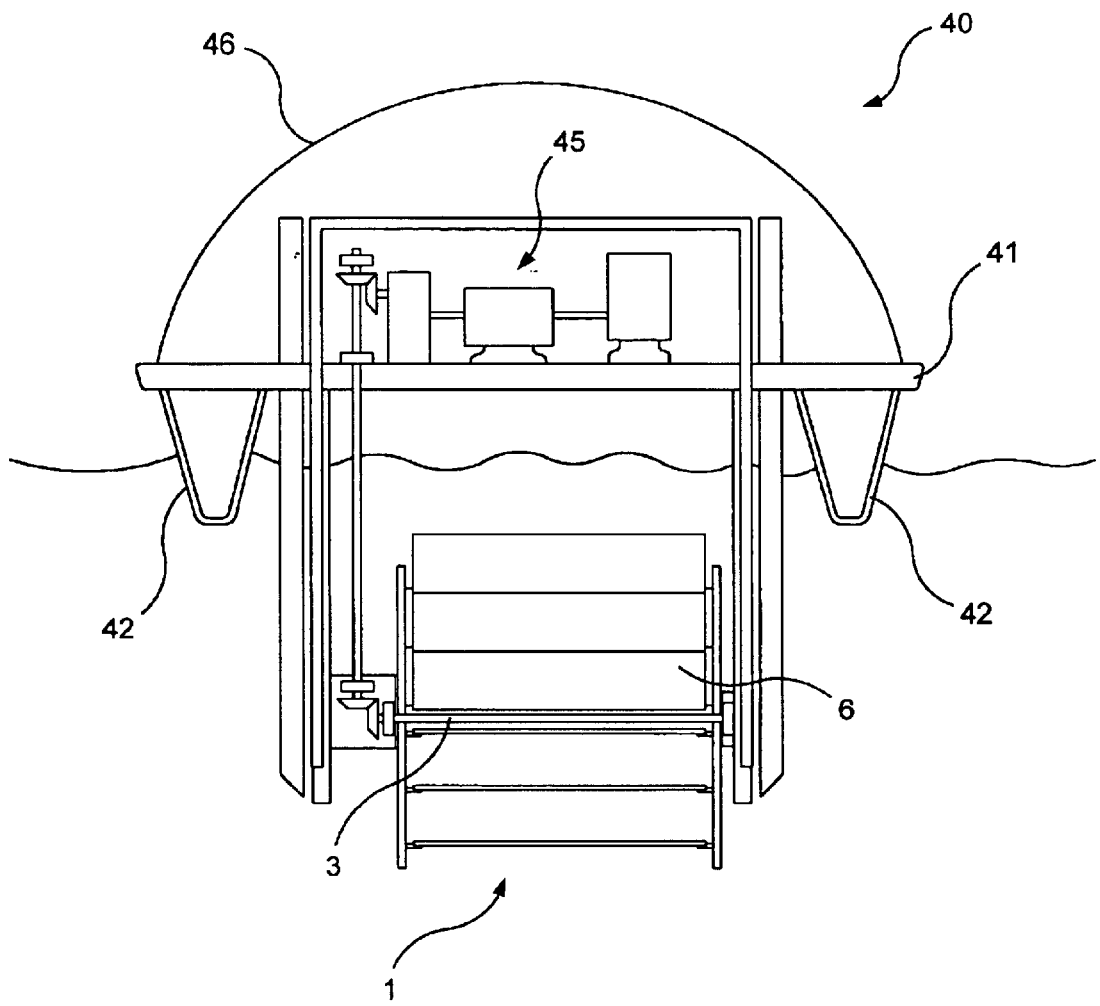
FIG. 7 is an elevation view showing details of the floating marine generator.

FIG. 7 shows a floating marine generator 40 having a platform 41 supported by floats 41 on the surface of the water. The float supports columns 43 which support rotary assembly 1 having a horizontally disposed rotary shaft 3. There are three vanes 5 in each panel, the panels being closed at the top and open at the bottom. Water current flows in the direction into the plane of the drawing.

A removable fixed structure 44 in the form of an inverted "U" projects over the platform passing over a conventional electrical generation system 45. A cabin 46 encloses the system 45.

Figure 8A:
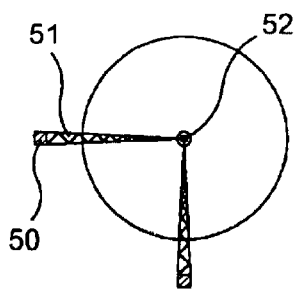
FIGS. 8A–8F show further details of the wind driven generator.
Figure 8B:
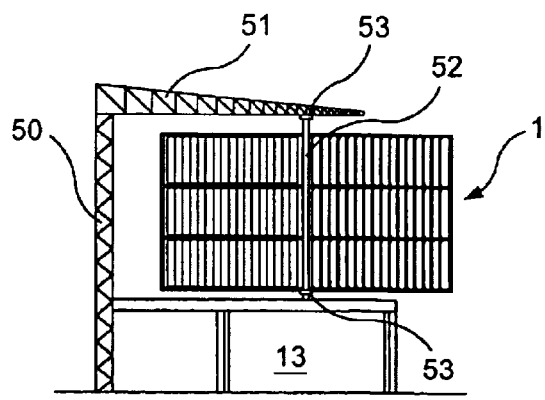

FIGS. 8A, 8B, 8C, 8D, and 8E, 8F show three embodiments of fixed structures for supporting the rotary assembly 1. In FIGS. 8A and 8B the support structure comprises two vertical columns 50 with radially inwards horizontal trusses 51 which meet at a center and support a fixed shaft 52 carrying bearings 53 rotatably supporting the rotary shaft of the rotary assembly 1. Disposed below the rotary assembly 1 is the generator room 13.

Figure 8C:
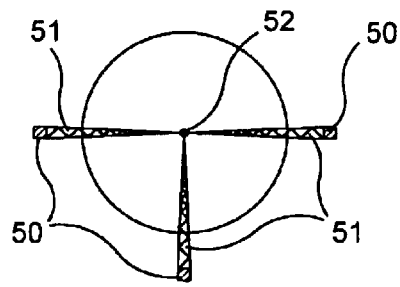
Figure 8D:
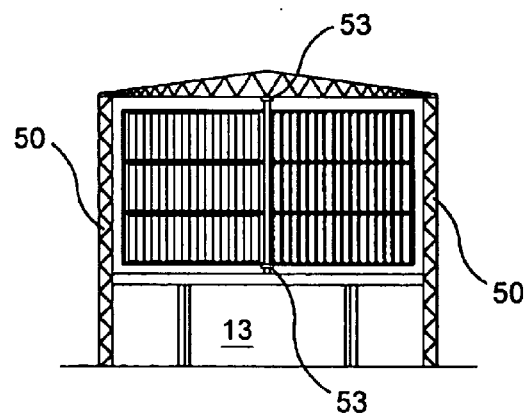

FIGS. 8C and 8D show a modified arrangement in which a third vertical column with horizontal trusses is provided diametrically opposite one of the other columns and its trusses are combined.

Figure 8E:
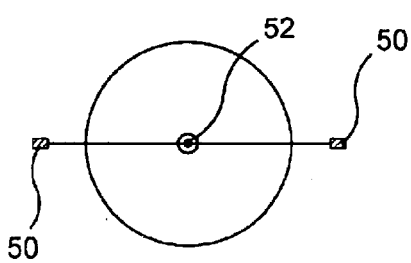
Figure 8F:
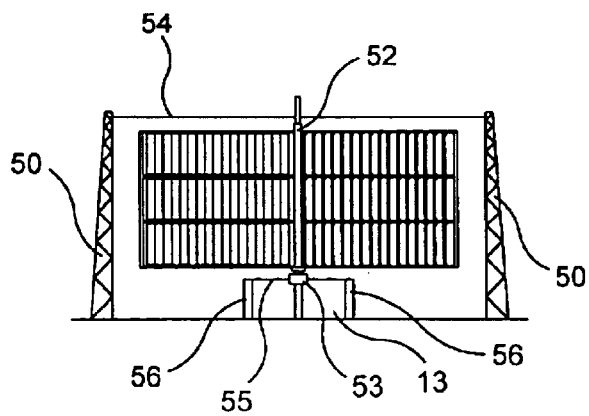

FIGS. 8E and 8F show the support structure with two diametrically opposite columns 50 supporting steel tension cables 54 which support the fixed shaft 52. The lower bearing 53 is supported by another tension cable on fixed posts 56.

Figure 9:
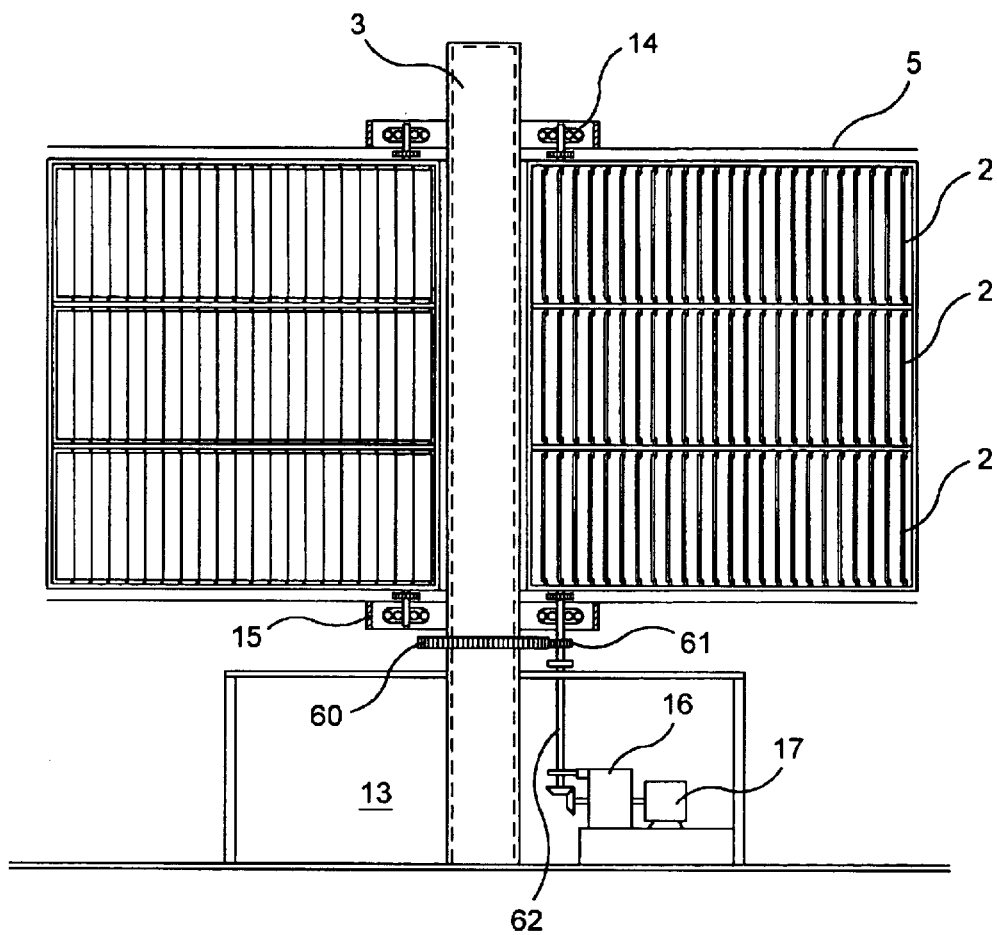
FIG. 9 is an elevation view showing details of the wind driven generator.

FIG. 9 shows a wind driven generator in which three sets of superposed panels 2 are secured to central rotary shaft 3 with open frame 5. Each panel includes twenty four vanes 6. The rotary shaft 3 and the frame 5 are supported on upper and lower bearings 14 and 15 supported by a framework (not shown). A pinion 60 is fixed on the rotary shaft 3 and meshes with a smaller pinion 61 secured on a transfer shaft 62 which extends into the electric generator room 13 to drive the electric generator 17 via the transmission 16.

Figure 10:
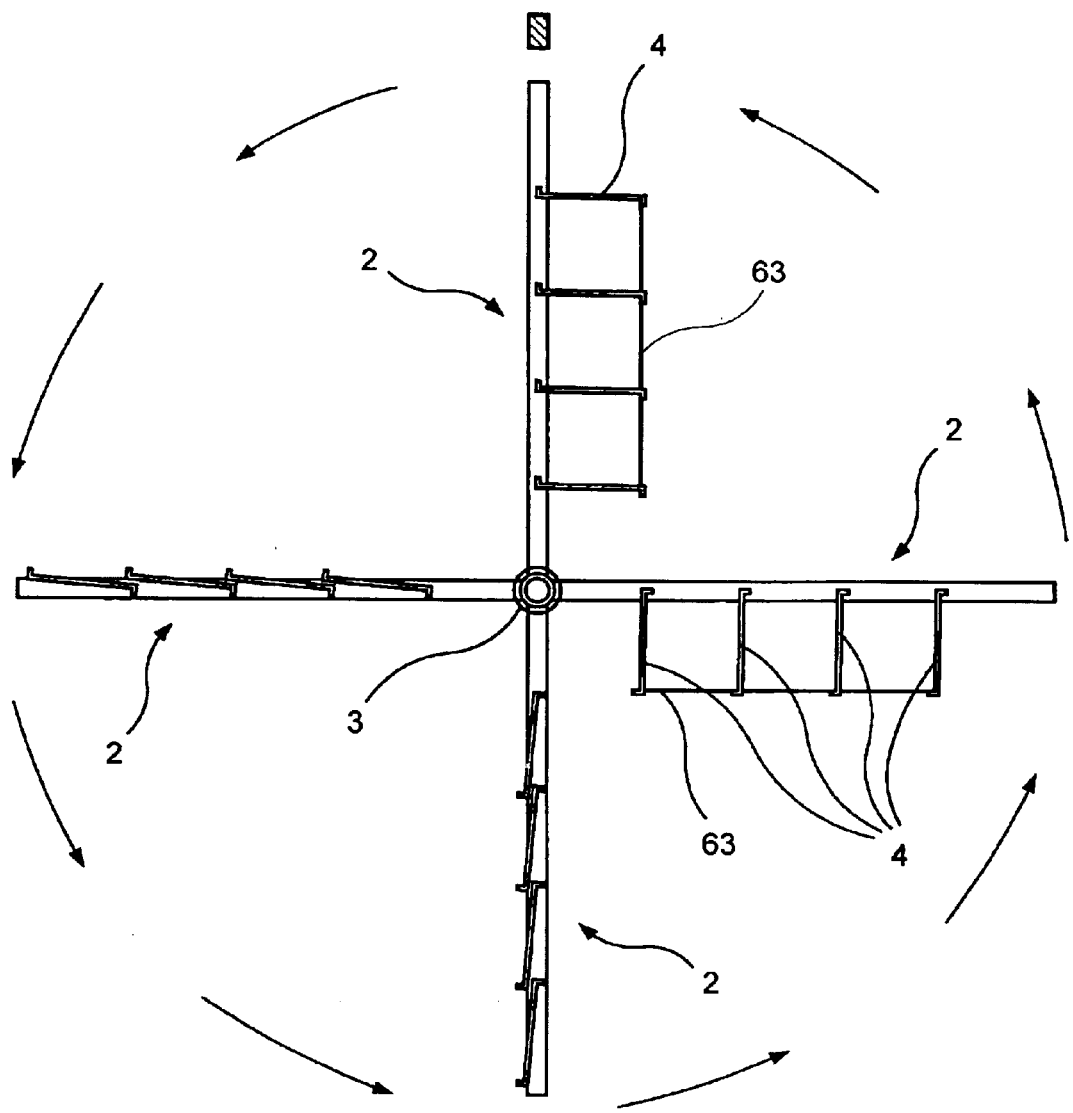
FIG. 10 is an explanatory plan view of the rotary unit of the wind driven generator.

FIG. 10 shows a wind driven generator having four panels which are seen in their different vane positions with the ends opposite the rotary shaft 3 joined by aligning cables 62, which join the vanes equidistantly to keep them in a uniform position, opening or closing them so their oscillating movement is synchronized.

Figure 11A:
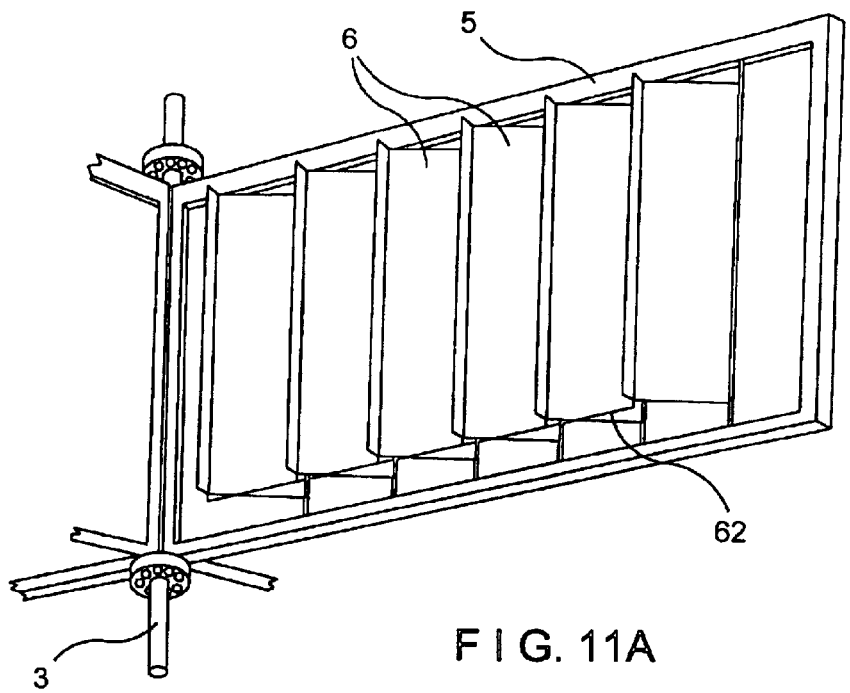
FIG. 11A is a perspective view of a vane assembly of the rotary unit.
Figure 11B:
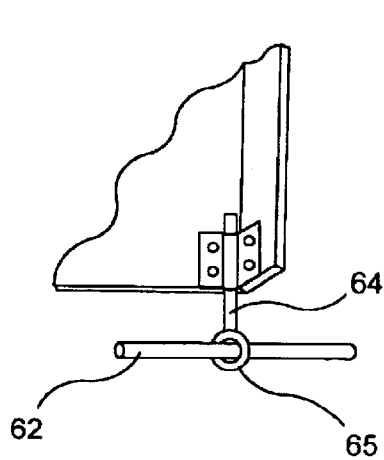
FIGS. 11B–11E show details of the vane assembly of FIG. 11A.

FIG. 11B shows a rotatable support 64 having a ring or washer 65 at its end with a hole through which the aligning cable 62 extends. The rotatable support is mounted in a bushing secured at the vertex of the bend at the inner edge of the vane 6.

Figure 11C:
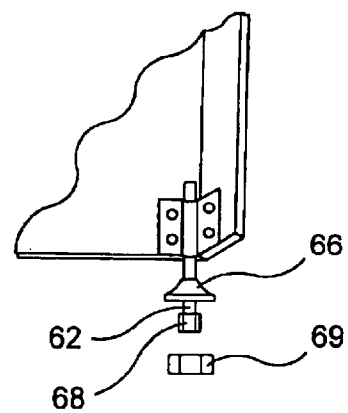

FIG. 11C shows another embodiment in which a support is welded or fixed to the vane and includes a lower pin 67 for rotatably engaging in a hole in a washer 68 fixed to the aligning cable 62. The lower end of the pin 67 is threaded to engage a nut 69.

Figure 11D:
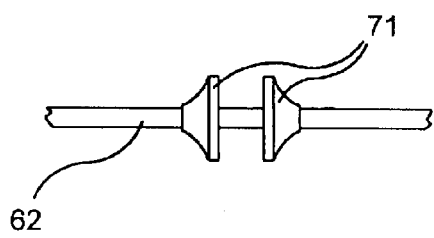

FIG. 11D shows two spaced stops fixed to the aligning cable 62 for receiving the ring 65 therebetween.

Figure 11E:
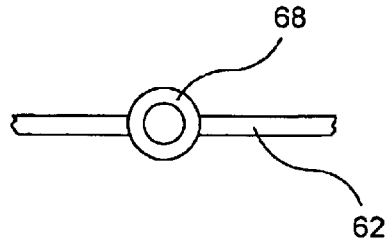

FIG. 11E shows the form of a bar with a washer 68 incorporated in the aligning cable 62 to receive the pin 66 fixed to the vane.

Figure 12:
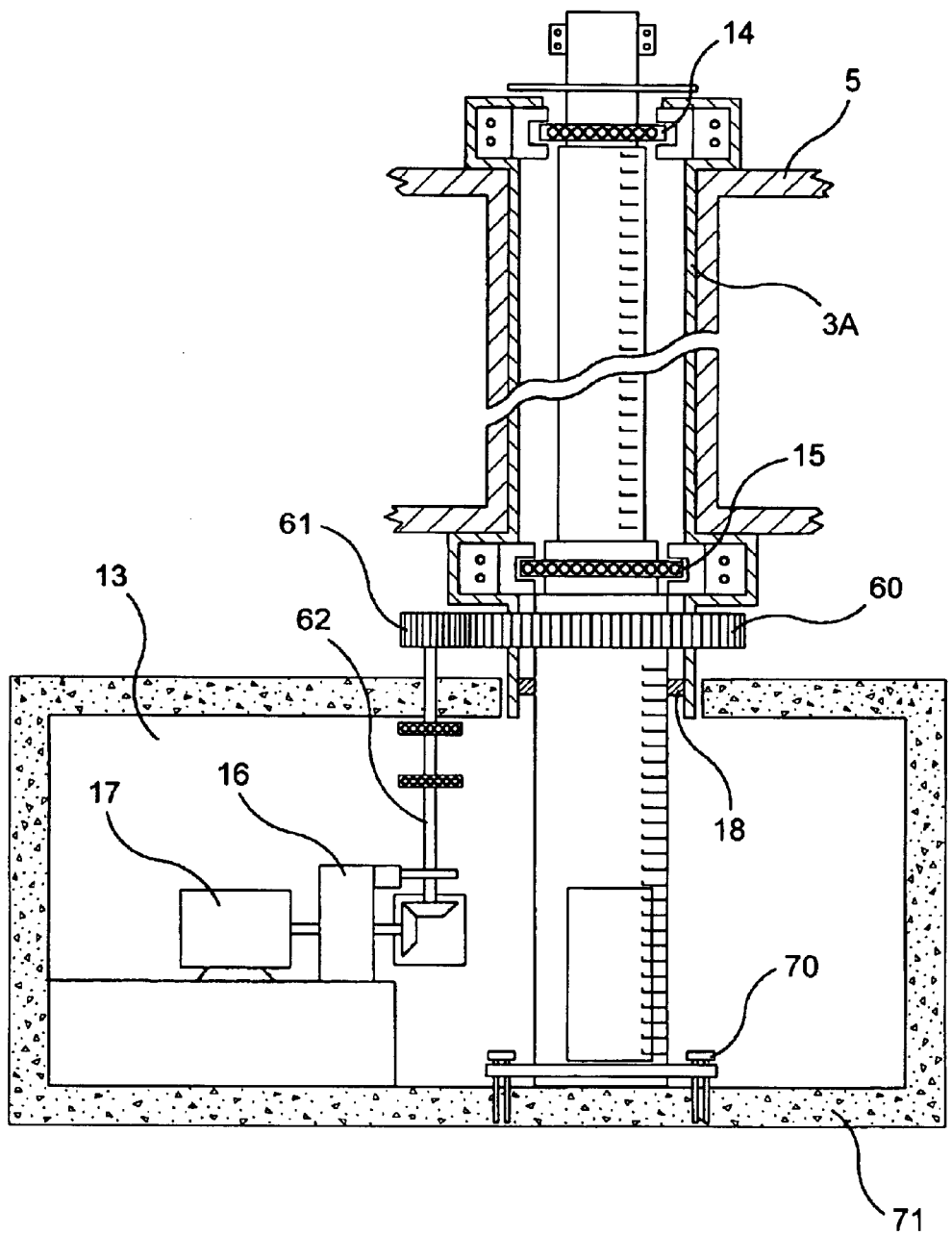
FIG. 12 is a diagrammatic illustration partly in section showing details of a rotary support of the wind driven generator.

FIG. 12 is similar to FIG. 9 and uses the same reference numerals to designate the same or similar elements. FIG. 12 is distinguished by its divided rotary shaft. Namely, the rotary shaft consists of upper rotary shaft part 3A and a fixed shaft part 3B. The rotary shaft part is rotatable on upper and lower bearings 14 and 15 and is rotated by the wind-driven panels 2 to rotate the pinions 60 and 61 to drive the generator 17. The fixed shaft part 3B is secured by bolts 70 to the floor 71 of the generator room. The fixed shaft part 3B extends upwardly and concentrically within the rotary shaft part 3A. Brake 18 is secured between the shaft parts 3A, 3B to brake the rotary shaft part 3A.

Figure 13A:
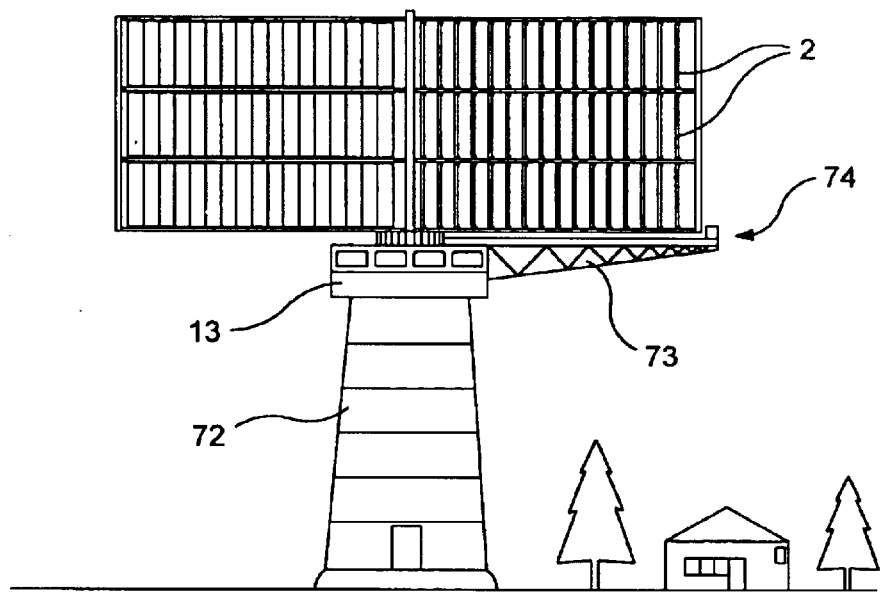
FIG. 13A is an elevational view of the wind driven generator showing an additional impulser.

FIG. 13A shows a wind driven generator mounted on a tower 72 with the generation room 13 in the upper part. At the right side and below the panels 2 is a horizontal truss extending beyond the panel on the right side. At the end of the truss is an additional impulse drive 74 for the wind driven generator comprising an electric motor 75 and a rotary cylinder 76, fixed to the lower end of the pane 12.

Figure 13B:
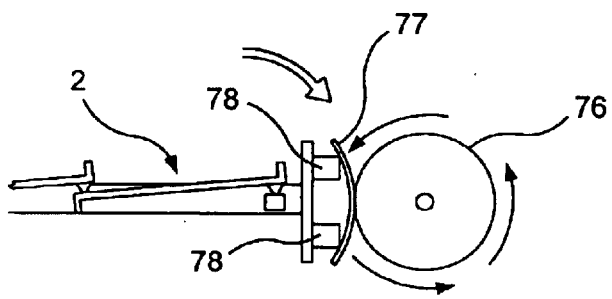
FIGS. 13B–13C illustrate details of FIG. 13A.
Figure 13C:
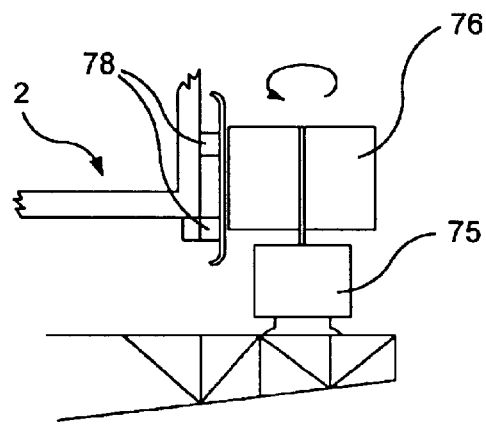

FIG. 13B there is seen a curved plate 77, supported from panel 2 by two horizontal springs 78 that absorb the changes in length of the panel frame and the truss and ensure pressure contact with the rotary cylinder 76, an arrow indicating the rotation direction of the rotary assembly. Another arrow indicates the rotation direction of the cylinder.

At the same time the impulse drive 74 is used as a horizontal maintenance means for the panel.

FIG. 14A shows a succession of train coaches 80 with two wind driven generators 81 on the roof of each one, which feed a central generator to provide electrical energy to partially or completely drive the train or other systems that save fuel.

FIG. 14B shows an automobile 82 with a wind driven generator 87 on the roof, which at a cruising speed of 60 to 100 km/h, from the impulsive force of the wind, generates sufficient electrical energy to partially or completely move the car.

Figure 15A:
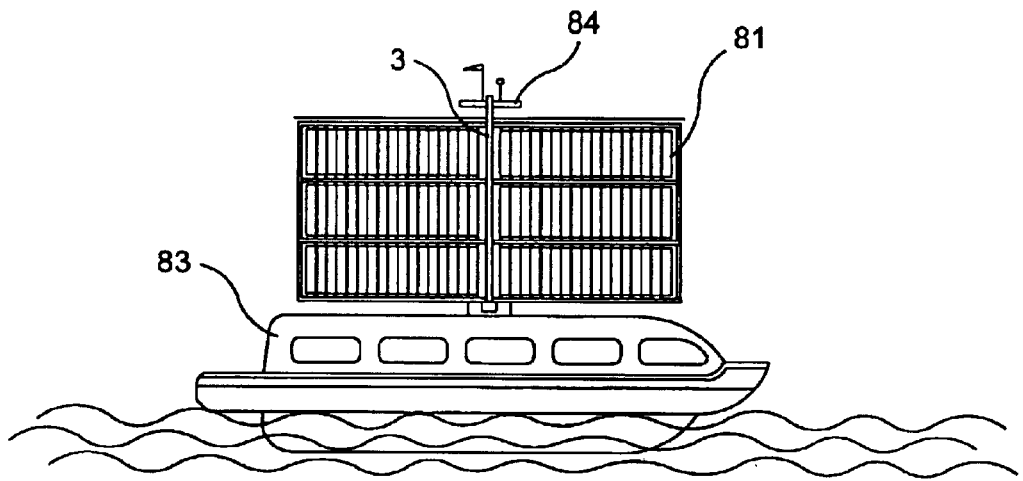
FIG. 15A is a side view showing the wind driven generator attached to a ship.

FIG. 15A shows a pleasure boat 83, with passenger and crew decks completely covered. Above the roof is a wind driven generator 81 that covers the whole length of the vessel, in such a way that advantage is taken of the maximum radius of surface area of the vessel, to install the generator 81 of great generating capacity. In the center is a cylinder 84 with a flag or radio communication and radar systems, and thereon supported by the divided rotary shaft 3 providing a duct for the external part and ventilation.

Figure 15B:
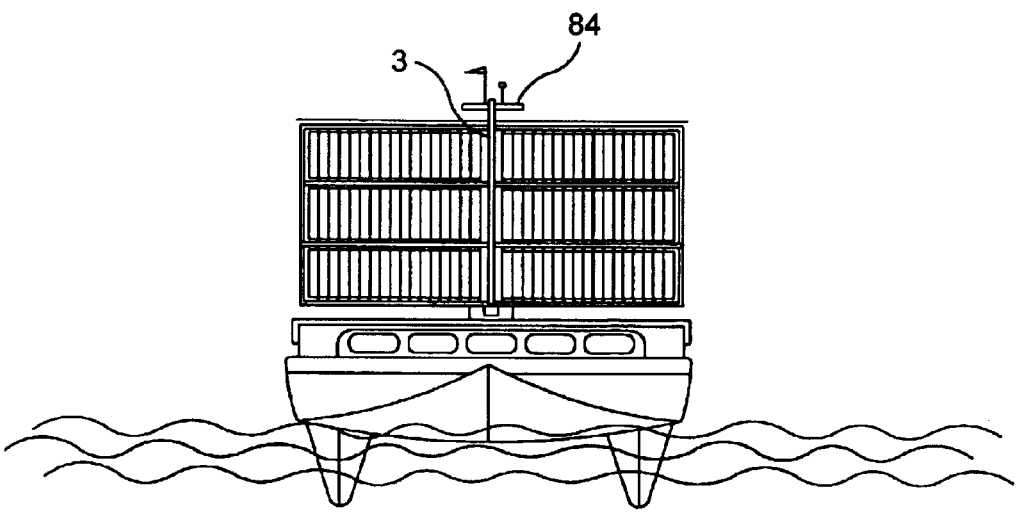
FIG. 15B is a front view of another embodiment of a ship with a wind driven generator.

FIG. 15B shows the vessel with catamaran type floats, on which is the crew room, the generator room and the tower with its flag.

FIG. 16A shows a dirigible 85 supporting the passenger and crew cabin 86 with a wind driven generator 81 between these two elements.

FIG. 17C shows an aircraft 87 or flying saucer having a pointed aerodynamic shape with two separate wind driven generators 81 thereon with their return halves in the center of the aircraft and the impulse halves on the outer side, the two turning in opposite directions.

FIG. 17 is a perspective view of a wind driven generator 81 floating in space and receiving solar wind impulses from the sun to rotate the lower panel in a counter-clockwise direction on its rotary shaft forming the cylinder of the orbital craft, with entry for the crew on its axis, and at the lower night, a sketch of the planet earth.

Figure 18:
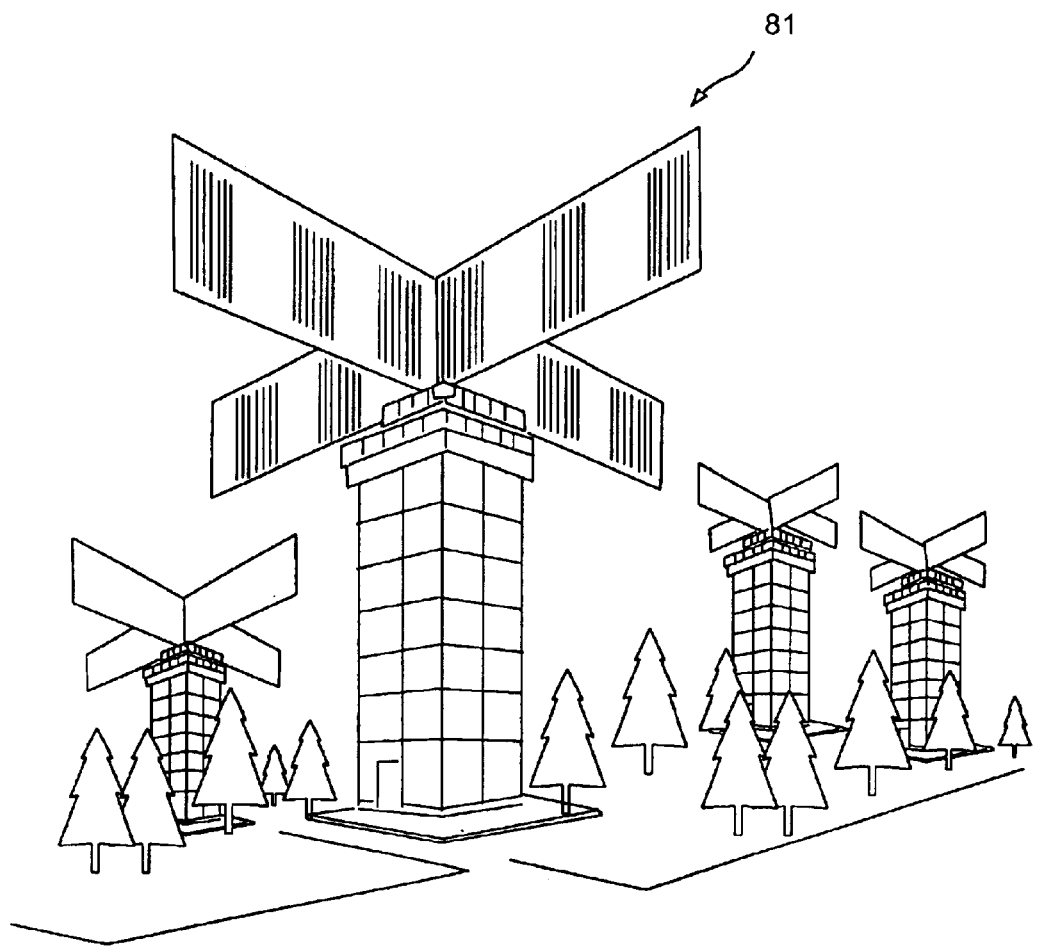
FIG. 18 illustrates a plurality of wind driven generators mounted on buildings.

FIG. 18 shows in the foreground an 8 story building in the form of a tower, with the last floor having dimensions exceeding those of the other floors, and on this, is a small generation room, and a gigantic wind driven generator with four panels.

At the left side, a similar generator is shown on top of an apartment building, and in the background to the right, are shown two adjacent apartment buildings with similar generators giving some idea of what the future might be for wind generation of electrical energy.

What is claimed is:

1. Apparatus for generating electrical energy from a flowing medium of wind or water comprising:
    a stationary supporting structure,
    a rotary structure supported for unidirectional rotation on said fixed structure,
    a rotary shaft supporting said rotary structure and rotatably supported by said fixed structure,
    said rotary structure comprising a plurality of panels each having an open frame and a plurality of vanes supported by said frame, said vanes comprising thin rigid plate members, each of said vanes having a opposite side edges and being rotatable supported at one of said side edges by said open frame for pivotable movement between an open position perpendicular to said frame and a closed position in a plane of the frame, said vanes being supported from said frame solely at said one of said side edges thereof so that top and bottom edges of the vanes are free and unrestrained such that when the vanes are in closed position and exposed to the flowing medium, the vanes will exert a rotational force on the frame to produce rotation of the rotary structure, a system for pivotably moving said vanes in synchronism between said open and closed positions including an aligner cable connecting said vanes at side edges thereof opposite said side edges at which said vanes are rotatably supported by said frame to synchronize rotation of the vanes as the vanes move between closed and open positions, oscillatory stops between said frame and said vanes to block rotatable movement of said vanes in the closed position and permit rotatable movement of the vanes to said open position, said aligner cable synchronizing movement of said vanes and limiting the angular movement to said open position, said rotary shaft extending outwardly from said frame, and supporting said frame so that its lower edge is free and the frame can undergo free travel without restriction, and means for generating electrical energy from rotation of the frame and the rotary shaft.

2. Apparatus as claimed in claim 1, wherein when the flowing medium is wind, the rotary shaft is vertical.

3. Apparatus as claimed in claim 1, wherein when the flowing medium is water the rotary shaft is horizontal.

4. Apparatus as claimed in claim 1, wherein said vanes first provide resistance against the flowing medium in said closed position and generate circular movement of the rotary structure and then allow the flowing medium to pass freely and by action of the oscillatory stops, produce unidirectional rotary movement, independent of the flow direction of the medium.

5. Apparatus as claimed in claim 1, comprising pins restricting said stops to limit rotation of said vanes to 90° and means for releasing said pins when the flowing medium develops a force exceeding a predetermined maximum value thereby releasing the vanes for free rotatable movement.

6. Apparatus as claimed in claim 1, comprising an aligner cable support comprising a thin member on each vane supporting said aligner cable.

7. Apparatus as claimed in claim 6, wherein said aligner cable passes through the cable supports on said vanes, said cable and said supports being adjustable to adjust distances between the vanes to correspond to the distance between pivot axes of the vanes such that the vanes rotate synchronously in closing and opening movements.

8. Apparatus as claimed in claim 7, comprising means controlling the oscillation stops responsive to high wind speed so that the vanes can rotate in the direction of wind flow, while the frame is braked.

9. Apparatus as claimed in claim 1, wherein each vane is rotatably supported by said frame at said one of the side edges by spindles rotatably connecting the vane to the frame at the top and bottom edges of the vane, the remainder of said one side edge of the vane between the spindles being disconnected from said frame.

10. Apparatus as claimed in claim 9, wherein said spindles extend outwardly of each vane at the top and bottom edges thereof and engage the frame thereat.

11. Apparatus as claimed in claim 9, wherein each said vane is bent at said one side edge thereof, said spindles being secured to said vane at a vertex where said vane is bent.

12. Apparatus as claimed in claim 9, comprising shock absorbers on said vanes for absorbing shock upon impact of said vanes with one another in the closed positions.

13. Apparatus as claimed in claim 1, wherein said aligner cable includes a plurality of washers fixed thereto in spaced relation along the cable, each said vane including a projecting member loosely fitted in a respective said washer and secured therewith.

14. Apparatus as claimed in claim 1, wherein each said vane includes a projecting member in the shape of a washer which slidably receives the aligner cable.

15. Apparatus as claimed in claim 14, comprising spaced stops on said aligner cable on opposite sides of said projecting member.

16. Apparatus as claimed in claim 1, wherein said oscillatory stops are secured to said frame to engage said vanes in the closed position thereof and produce rotation of the frame.

17. Apparatus as claimed in claim 16, wherein said oscillatory stops are disposed at upper and lower edges of the frame.

18. Apparatus as claimed in claim 1, further comprising an additional impulse drive to rotate the rotatable structure.

19. Apparatus as claimed in claim 18, wherein said additional impulse drive comprises a motor in driving connection with said panels.

* * * * *